Figure 1:
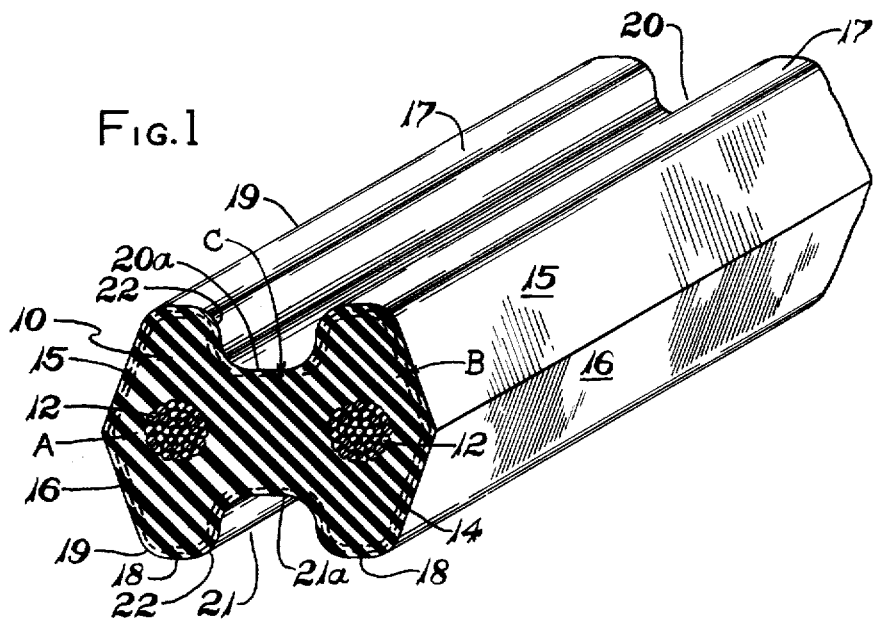

INVENTOR.
RALPH F. GARNER
BY John D. Haney
ATTY.

United States Patent Office 3,098,778
Patented July 23, 1963

---

3,098,778
BELT
Ralph F. Garner, Cuyahoga Falls, Ohio, assignor to The
B. F. Goodrich Company, New York, N.Y., a corporation of New York
Filed May 8, 1957, Ser. No. 657,907
7 Claims. (Cl. 154—52.2)

This invention relates to side-driving power transmission belts commonly known as V-type belts and formed of fabric and rubber-like material.

In certain V-belt drives, especially those transmitting substantial power loads, it has been observed that some belts flip sideways or become inverted in their pulley sheaves after a short operating period, even though the belts may be practically new. Obviously, this instability of the belts materially reduces the efficiency of the drives in which such belts are incorporated and may even render the drives inoperative by prompt destruction of the belts through progressive failure of the tension members of the belt. The present invention provides a belt particularly designed for stability of operation in this respect without sacrificing the power transmission capacity proportional to the size and strength of the belt.

A V-belt has its maximum flexibility in a plane perpendicular to the transverse plane of its tensile reinforcing members which is the so-called "neutral driving plane" of the belt. Ideally, a V-belt is designed so that the neutral driving plane of its tension members is perpendicular to the plane in which the belt is trained for operation, and thus the belt will flex easily as it passes about the pulleys of the drive. However, it has been very difficult to make these belts with the plane of the tension elements located accurately in this ideal position. In my study of this problem I have found that either during assembly or in subsequent vulcanization, the plane of the tension members in at least some places in the belt very often becomes canted toward the inner or outer faces of the belt. Consequently, at these places the belt has its maximum flexibility in a plane appreciably oblique to the plane of the belt pulleys. Thus when such a belt is subsequently trained about a set of pulleys, it must be forcibly urged into its operating plane. This results in subjecting the belt to substantial torsional force tending to intensify the lateral pressure on one driving face and to rotate the belt upward out of its pulley groove about the heavily loaded face. Inasmuch as belts of conventional construction are quite stiff laterally (indeed it has often been proposed to include special lateral stiffeners in the belts), the torsional force imposed on the belt as it is forcibly deflected about its pulleys is transmitted for an appreciable distance back through the run of the belt approaching each pulley. Accordingly, the runs of the belt tend to wobble or oscillate about the longitudinal axis of the belt as the belt is driven around the pulleys. This tends to overload certain of the tensile members and leads to progressive failure of these members and eventually the belt may become totally destroyed by inversion on the pulleys.

I have found that by constructing a belt with substantial transverse and torsional flexibility the operating stability of the belt is greatly improved without sacrificing any of the load carrying capacity of the belt, even through the plane of the tension members may become objectionably canted in the manufacturing procedure. Additionally, a belt constructed in accordance with this invention has the particular advantages of sustaining shock loads without appreciable damage to the belt body, and it also maintains substantially equalized pressure on the side driving faces of the belt. Moreover, the construction provides for improving the life of the fabric cover of the belt.

Figure 2:
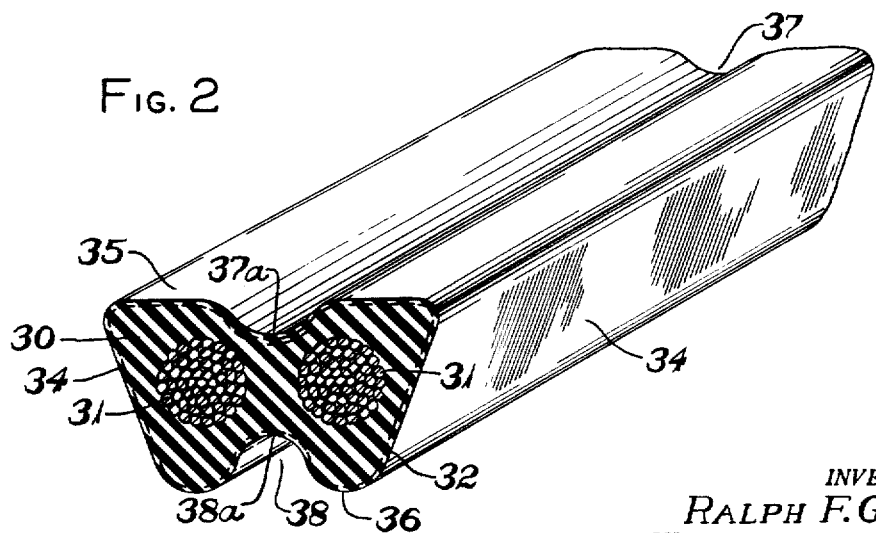

Details of the belt construction provided by this invention and the manner in which the improved results are obtained will be more fully explained in conjunction with the embodiments of the invention illustrated in the accompanying drawing in which:

FIG. 1 shows a cross-sectional view of a hexagonal or double V-belt embodying this invention; and FIG. 2 shows a cross-sectional view of a single V-belt also made in accordance with the invention.

The belt of FIG. 1 is formed with a flexible body 10 of resilient rubber material which is internally reinforced with a pair of laterally spaced parallel flexible cabled tension elements 12, and which is externally enclosed by a two ply cloth cover 14.

The belt has two sets of side-driving faces 15 and 16, respectively, on opposite sides of the neutral driving plane of the belt defined by the cabled tension elements 12. The sets of side driving faces 15 and 16 merge, respectively, with outer and inner circumferential faces 17 and 18 of the belt at circumferentially continuous corners 19 which are rounded to minimize corner wear and whipping and shaking of the belt runs as the belt enters or exits from its pulley grooves.

Each cable tension element 12 comprises a bundle of cords of high strength material which are twisted upon themselves or otherwise entwined to form a cable-like member of generally circular cross section. Preferably the belts are made in endless form and the tension elements 12 are endless annular grommets which are entirely free of splices and have only two cord ends in each so that they are of uniform flexibility throughout to avoid pulsations and destructive localized bending. Such grommets may be made advantageously in accordance with the teaching of U.S. Patent 2,233,294, for example. Preferably the cable tension elements are spaced apart so that each is located as close as possible to the adjacent side driving face.

In the outer and the inner circumferential faces 17 and 18 of the belt, there are grooves 20 and 21, respectively, opening from adjacent the margins of these faces into the body of the belt in opposed relation and extending longitudinally of the body. The corners 22 of the grooves 20 and 21 are broadly rounded. The grooves 20 and 21 separate the belt body 10 into two flank portions A and B in each of which one of the cabled tension members 12 is embedded. The bottom surfaces 20a and 21a of these grooves 20 and 21 define the opposing sides of a thin central flexible rubber hinge portion C of the belt body which interconnects and is integral with the flank portions A and B. The hinge portion C is located well inward from the circumferentially continuous corners 19 of the inner and outer faces and is in the plane of the pair of cabled tension members 12.

The hinge portion C provides for substantial transverse flexibility of the belt; that is to say it provides for relative flexibility of the flank portions about a central belt axis midway between the cabled tension members 12 and perpendicular to the plane of the cross section illustrated. Inasmuch as the hinge portion C is offset inwardly from the margins of both the inner and outer belt faces, the belt also has exceptional torsional flexibility. When the belt is subject to a torison load, one flank portion may be deflected on hinge portion C relative to the other flank portion without appreciably wrinkling the belt cover on the inner or outer faces.

The thickness of the hinge portion of the belt preferably does not exceed about twice the diameter of the cabled eleemnts 12 and this thickness may be about equal to the diameter of the cabled elements 12 to provide adequate torsional flexibility. In the belt shown in FIG. 1, the thickness of hinge portion C is about equal to the center-to-center distance between the tension elements 12, and belts of these proportions have been found to operate very effectively in service. Even though the hinge portion C is quite thin, it still provides adequate lateral stiffness for the belt because it is located in the plane of the cabled tension members 12 and is comparatively narrow.

A belt made in accordance with this invention does not tend to invert itself in the pulleys about which it is trained even though the plane of the cabled elements may be objectionably canted at some places throughout the length of the belt, apparently because the hinge portion C is adapted to flex to permit displacement of one flank portion relative to the other so that the belt can be easily bent about its pulleys in the desired operating plane. Accordingly, the torsional force imposed on the belt under these circumstances acts to distort or flex hinge portion C rather than to rotate the complete body of the belt about one of its side driving faces as occurs in the constructions heretofore employed. Inasmuch as the belt has substantial torsional flexibility, comparatively little of the torsional force imposed on the belt is transmitted to the runs of the belt approaching the pulleys. Thus even though one of the flank portions may ride slightly closer to the mouth of a pulley groove than the opposing flank portion, the tendency for the belt to become inverted is greatly minimized.

A belt made in accordance with this invention is particularly well adapted to sustain shock loads without damage to the belt carcass. When the belt is subjected to a shock load, the cabled tension members 12 are forced toward the bottom of the pulley grooves thereby flexing the flank portions about the center hinge portion C and tending to close the groove in the circumferential face of the belt directed toward the bottom of the pulley groove.

As shown in FIG. 1 the margins of the cloth plies of the cover 14 terminate near the bottom corners of the grooves, the inner ply margins terminating near the bottom corners of groove 21 and the outer ply margins terminating near the bottom corners of groove 20. This advantageously eliminates any lap seams in the cover, thus avoiding the objectionable stiffness which may result from lap seams. However, if the cover margins are joined by lap seams, this lap should be located on the bottom portions of the hinge section so that the seams are comparatively close to the neutral driving plane of the belt. Consequently, the seams are less likely to be torn open when the belt is flexed than is the case in conventional constructions where the cover seams are customarily located on an outer flat circumferential face of the belt.

Also the cover plies are preferably a square-woven cloth laid on the bias about the belt. Since the cover plies are folded over the corners 19 and then into each groove 20 and 21, and since the grooves are rather deep, the threads from which the cover plies are woven are primarily stressed in torison in the gerions near the corners 19 when the belt is flexed about its pulleys. Consequently, this construction minimized the tendency for the cover threads to saw against each other when the belt is flexed as occurs in belts in which the inner and outer circumferential faces are flat, and therefore prolongs the useful life of the cover.

The belt construction shown in FIG. 2 includes a flexible body portion 30 of resilient rubber material reinforced with a pair of cabled tension elements 31 and enclosed by a cloth cover 32. The belt differs from that in FIG. 1 in that it is of generally trapezoidal cross-sectional shape and thus has only two opposing side driving faces 34 which taper toward each other from a wide outer circumferential face 35 to a narrower inner circumferential face 36. The outer and inner circumferential faces include longitudinal grooves 37 and 38, respectively, extending toward each other and terminating in bottom portions 37a and 38a defining the opposing surfaces of a flexible central hinge portion D located between and in the plane of the cabled reinforcing elements. In its other construction details the belt of FIG. 2 resembles that of FIG. 1 and the belt of FIG. 2 provides essentially the same operational characteristics and advantages of the belt of FIG. 1.

In view of the torsional flexibility of the belts provided by this invention, these belts are also particularly well suited for the so-called quarter turn drives in which the belts are trained between pulleys mounted for rotation on mutually perpendicular axes.

Variations in the construction described may be made within the scope of the appended claims.

I claim:

1. A side-driving power transmission belt comprising a flexible resilient rubber body having only side-driven faces and having a single pair of laterally-spaced flexible cabled elements each embedded longitudinally in the body near a driving face, and said body having inner and outer circumferential faces in each of which there is a groove opening from adjacent the margins of said inner and outer faces and extending longitudinally of the body, the grooves of said faces extending toward each other in opposed relation and their bottoms defining opposing sides of a longitudinal flexible hinge portion of the body free of longitudinal reinforcing members and integral with the portions of the rubber body in which the reinforcing elements are embedded and located between and in the plane of said cable elements and about which hinge portion the body is transversely flexible.

2. A side-driving power transmission belt comprising a flexible resilient body having side driving faces and having a single pair of laterally spaced flexible cabled elements each embedded longitudinally in the body near a driving face, and said body having inner and outer circumferential faces merging with said side-driving faces at circumferentially continuous corners, said inner and said outer faces each having a groove extending longitudinally of the body with the lateral sides of each groove located adjacent the corners of its respective face, the grooves extending toward each other in their respective faces and their bottoms defining opposing sides of a longitudinal flexible hinge portion of the body free of longitudinal reinforcing members and integral with the portions of the rubber body in which the reinforcing elements are embedded and located between and in the plane of said cable elements and about which hinge portion the body is transversely flexible.

3. A side-driving power transmission belt characterized by substantial transverse and torsional flexibility, said belt comprising a flexible body portion of resilient rubber material having opposing outwardly directed cloth-covered side-driving faces with circumferentially continuous inner and outer margins and having a pair of laterally-spaced flexible cabled reinforcing elements each embedded longitudinally in said rubber material near a driving face thereof, and said body having inner and outer circumferential faces each shaped concavely relative to the plane of said cabled reinforcing elements from a location adjacent said margins of said side-driving faces, said inner and outer faces being separated by a comparatively thin portion of rubber material free from internal longitudinal reinforcing members and located between and in the plane of said cabled elements and providing a flexible hinge longitudinally of the belt about which the belt is transversely flexible.

4. A belt in accordance with claim 3 in which said cover cloth is square-woven fabric laid on the bias and having margins located adjacent said hinge section on one of said concave faces.

5. A belt in accordance with claim 3 in which the corners between said inner circumferential face and said side-driving faces are rounded.

6. A side-driving power transmission belt comprising a flexible resilient rubber body of generally hexagonal cross-sectional shape, a single pair of laterally-spaced parallel flexible cable reinforcing elements embedded longitudinally in said body substantially in the plane of one of the major transverse diagonals of the body and close to the termini of said diagonal only, said elements defining a neutral driving plane substantially coinciding with said diagonal, said body including two sets of opposing side-driving faces, the driving faces of each set tapering toward each other from longitudinal corners at the termini of said neutral plane, and inner and outer circumferential faces each having circumferentially continuous margins and a groove opening from adjacent said margins and extending longitudinally of the body, the grooves extending toward each other in opposed relation and their bottoms defining opposing sides of a longitudinal flexible hinge portion of the body free of longitudinal reinforcing members and integral with the portions of the rubber body in which the reinforcing elements are embedded and located between and in the plane of said cable elements and about which hinge portion the body is transversely flexible.

7. A side-driving power transmission belt comprising a flexible resilient rubber body of generally trapezoidal cross-sectional shape having two opposing side-driving faces tapering toward each other from a wide outer circumferential face to a narrower inner circumferential face and having a single pair of laterally-spaced parallel flexible cabled reinforcing members embedded longitudinally in the body each adjacent a side-driving face and near said outer face, said inner and said outer circumferential faces each having a groove opening from near the margins of said faces and extending longitudinally of the body, the grooves extending toward each other in opposed relation and their bottoms defining opposing sides of a longitudinal flexible hinge portion of the body free of longitudinal reinforcing members and integral with the portions of the rubber body in which the reinforcing elements are embedded and located between and in the plane of said cabled elements and about which the body is transversely flexible.

References Cited in the file of this patent

UNITED STATES PATENTS

| | | |
|---|---|---|
| 1,425,021 | Kepler | Aug. 8, 1922 |
| 1,805,442 | Wallfisch | May 12, 1931 |
| 2,029,381 | Merrill et al. | Feb. 4, 1936 |
| 2,214,098 | Carlson | Sept. 10, 1940 |
| 2,296,740 | Reiling | Sept. 22, 1942 |

UNITED STATES PATENT OFFICE
CERTIFICATE OF CORRECTION

Patent No. 3,098,778                                              July 23, 1963

Ralph F. Garner

It is hereby certified that error appears in the above numbered patent requiring correction and that the said Letters Patent should read as corrected below.

Column 1, line 64, for "through" read -- though --; column 2, line 68, for "eleemnts" read -- elements --; column 3, line 55, for "torison in the gerions" read -- torsion in the regions --; column 4, line 13, for "having only side-driven" read -- having side-driving --; line 14, after "having" insert -- only --; same column 4, line 74, for "cable" read -- cabled --.

Signed and sealed this 19th day of May 1964.

(SEAL)
Attest:
ERNEST W. SWIDER

Attesting Officer

EDWARD J. BRENNER
Commissioner of Patents